(12) United States Patent
Peters et al.

(10) Patent No.: US 7,114,510 B2
(45) Date of Patent: Oct. 3, 2006

(54) VALVE WITH SMART HANDLE

(75) Inventors: Mark E. Peters, Hamilton, OH (US); Gregory W. Popp, Lebanon, OH (US)

(73) Assignees: INO Therapeutics, Inc., Clinton, NJ (US); Ventek LLC, West Chester, OH (US)

( * ) Notice: Subject to any disclaimer, the term of this patent is extended or adjusted under 35 U.S.C. 154(b) by 237 days.

(21) Appl. No.: 10/416,870

(22) PCT Filed: Nov. 15, 2001

(86) PCT No.: PCT/US01/45519

§ 371 (c)(1),
(2), (4) Date: May 15, 2003

(87) PCT Pub. No.: WO02/40914

PCT Pub. Date: May 23, 2002

(65) Prior Publication Data

US 2004/0045608 A1  Mar. 11, 2004

Related U.S. Application Data

(60) Provisional application No. 60/249,765, filed on Nov. 17, 2000.

(51) Int. Cl.
*F16K 37/00* (2006.01)
(52) U.S. Cl. .................. 137/1; 137/552.7; 251/129.04; 4/623
(58) Field of Classification Search ............. 137/552.7, 137/1; 4/623; 251/129.04
See application file for complete search history.

(56) References Cited

U.S. PATENT DOCUMENTS

| | | | |
|---|---|---|---|
| 5,202,666 A | * | 4/1993 | Knippscheer ............ 340/573.1 |
| 5,409,037 A | | 4/1995 | Wheeler et al. |
| 5,441,070 A | * | 8/1995 | Thompson .................... 137/1 |
| 5,680,329 A | | 10/1997 | Lloyd et al. |
| 5,945,910 A | * | 8/1999 | Gorra ........................ 340/573.1 |
| 6,003,170 A | * | 12/1999 | Humpert et al. ................ 4/623 |
| 6,236,317 B1 | * | 5/2001 | Cohen et al. ............. 340/573.1 |

FOREIGN PATENT DOCUMENTS

| | | |
|---|---|---|
| EP | 0961065 | 12/1991 |
| WO | WO 9836245 | 8/1998 |

* cited by examiner

*Primary Examiner*—A. Michael Chambers
(74) *Attorney, Agent, or Firm*—Gibbons, Del Deo, Dolan, Griffinger and Vecchione

(57) ABSTRACT

A valve with a smart handle including a memory module to log relevant data. A sensor on the handle determines when the valve is open, and this triggers the start of timers and recording of the "open" event in a log in the memory module. When the valve is closed, the sensor triggers stopping of the timers and recording of the "closed" event in the log. The timer information is used to calculate the duration of the time "open" event, and this, together with the actual date and time of the opening and closing of the valve are recorded in the log. Other relevant information, such as cylinder fill date, cylinder I.D. number, batch number, and patient name or account number may also be logged in the memory module. The log of the events and the corresponding dates and times may be used to prepare invoices for billing gas treatments, for inventory control, and for other record-keeping and control functions.

18 Claims, 12 Drawing Sheets

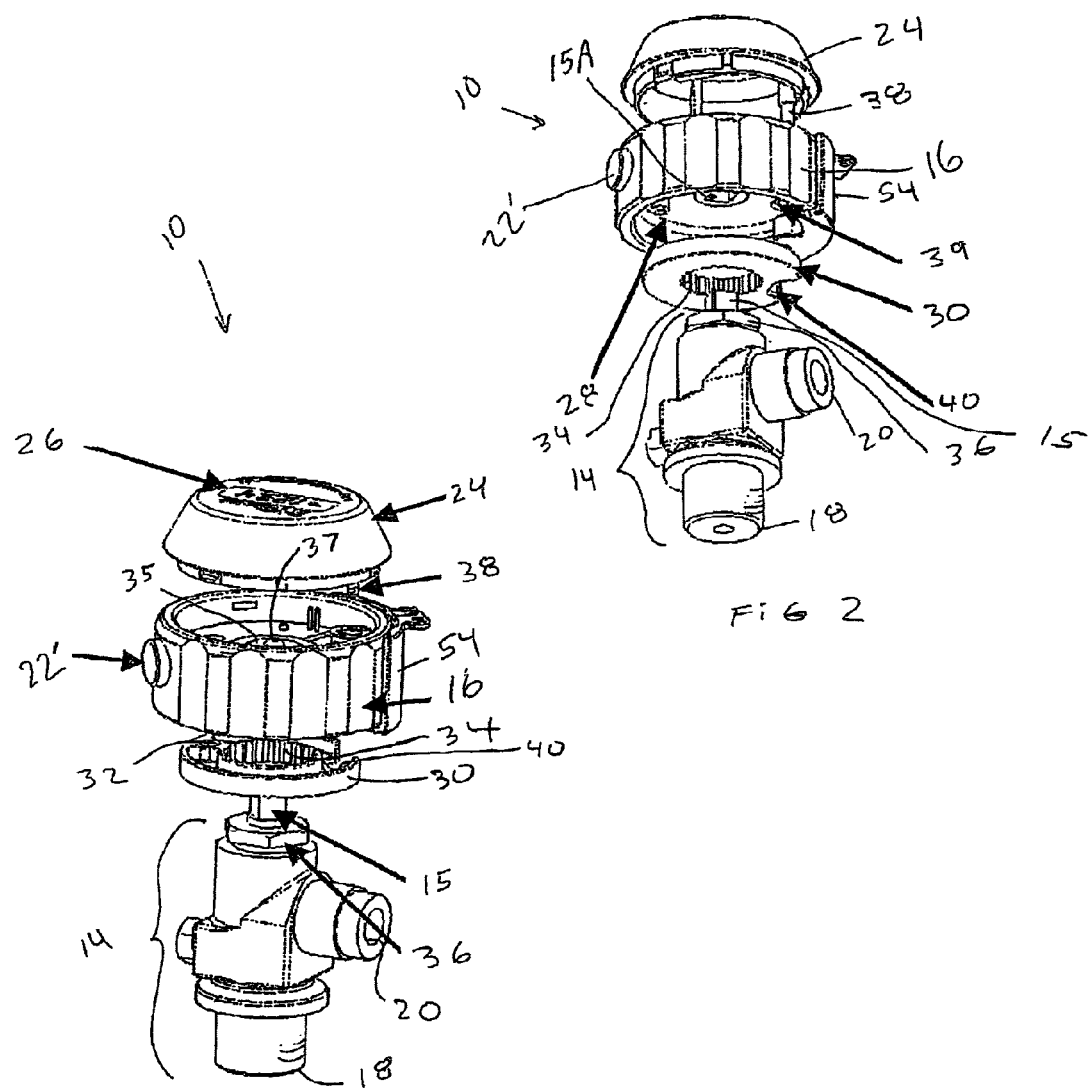

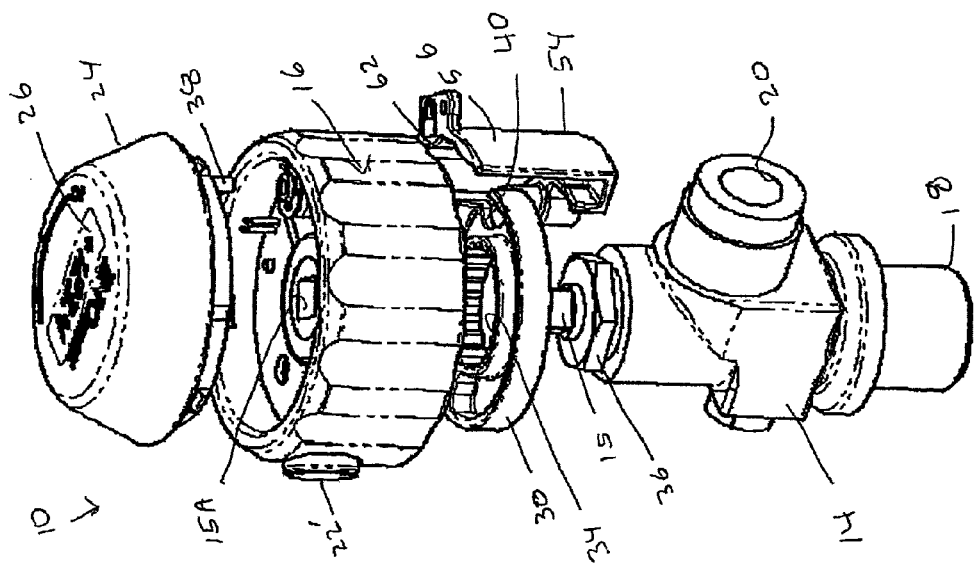
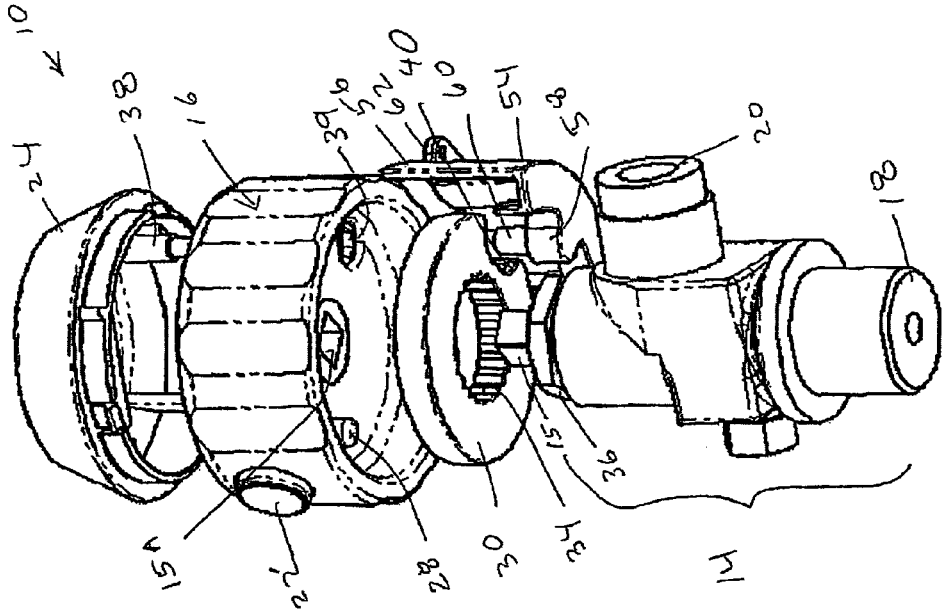

HA7MB - Palm IIIxe, VII to 1-Wire Host Adapter with iButton site.

VALVE WITH SMART HANDLE

This application is a National Stage Application of PCT/US01/45519 which claims priority from U.S. Provisional Application Ser. No.: 60/249,765 filed 17 Nov. 2000.

BACKGROUND OF THE INVENTION

The present invention relates to valves and, in particular, to a valve with a special handle that tracks the usage of the valve to enable logging and billing. The valve handle may thus be used not only to dispense a gas but, in combination with the disclosed procedure, to provide a method for conveniently providing tracking of the use of the gas and subsequent billing for medical treatments using the gas.

Some medical treatments involve the use of gases that are inhaled by the patient. In the past, medical gas suppliers have charged for the gas in the cylinder at the time of delivering the filled cylinder to the user. This method has been used both for industrial and medical uses. Pharmaceutical gases, dispensed by prescription, have great variability of use from patient to patient due to treatment regimen and dispensing methods. A method of charging for treatment time would be a desirable way for allocating the true value of the product. However, in the past, there has not been a way to automatically track the duration of treatments by cylinder or to tie the treatments to the patients who receive the treatments in order to make it easy to bill for use of the gas. Such a method is provided in accordance with the present invention.

SUMMARY OF THE INVENTION

The present invention provides a valve with a smart handle for the gas bottle (or cylinder). This valve records all the treatment information and makes the information readily accessible for use in tracking and invoicing. It permits the vendor to invoice the user for total treatment time and to provide users, such as hospitals or clinics, the information to bill individual patients. It also provides both the vendor and the user with data which is useful for trend analysis and inventory control.

The valve handle includes sensors for sensing the opening and closing of the valve, a timer for timing the duration over which the valve is opened, and an electronic memory device which records the pertinent information. The information recorded by the memory device may include the cylinder fill date, the lot batch number, cylinder number, the patient's name, the number of times the valve is opened, and the date, time, and duration of each opening of the valve, as well as additional information, if desired.

The data then can be readily transferred from the memory device to a device that generates reports or invoices.

BRIEF DESCRIPTION OF THE DRAWINGS

FIG. 1 is an exploded, perspective view of an example of a valve with a smart handle made in accordance with the present invention;

FIG. 1A is the same view as FIG. 1 but from a different perspective and with the lock mechanism further exploded from the view;

FIG. 2 is the same view as FIG. 1 but from a different perspective;

FIG. 2A is the same view as FIG. 1 but with the lock mechanism further exploded from the view;

DESCRIPTION OF THE PREFERRED EMBODIMENT

FIGS. 1–16 show a first preferred embodiment of the present invention. A valve 10 is provided, which may be attached onto a gas cylinder 12. The cylinder may contain pharmaceutical gas or other gases.

Figure 2B:
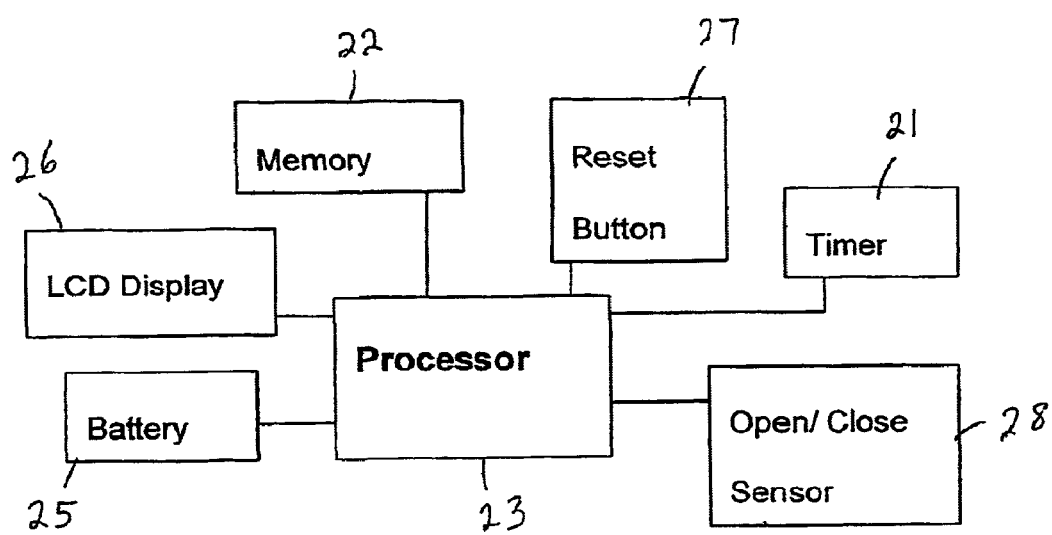
FIG. 2B is a schematic diagram showing the processor mounted on the handle of FIG. 1 and the input/output devices associated with it.
Figure 3:
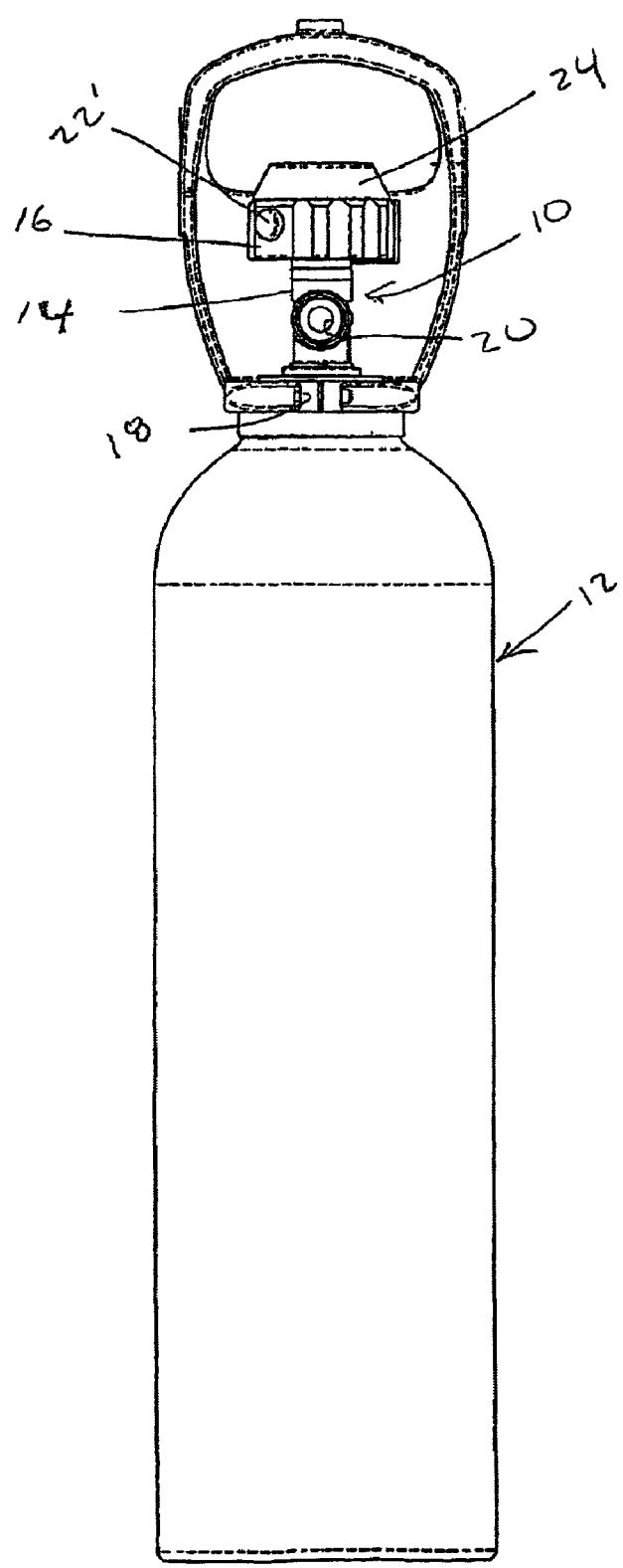
FIG. 3 is a side view of the valve of FIG. 1 mounted on a gas cylinder.
Figure 4:
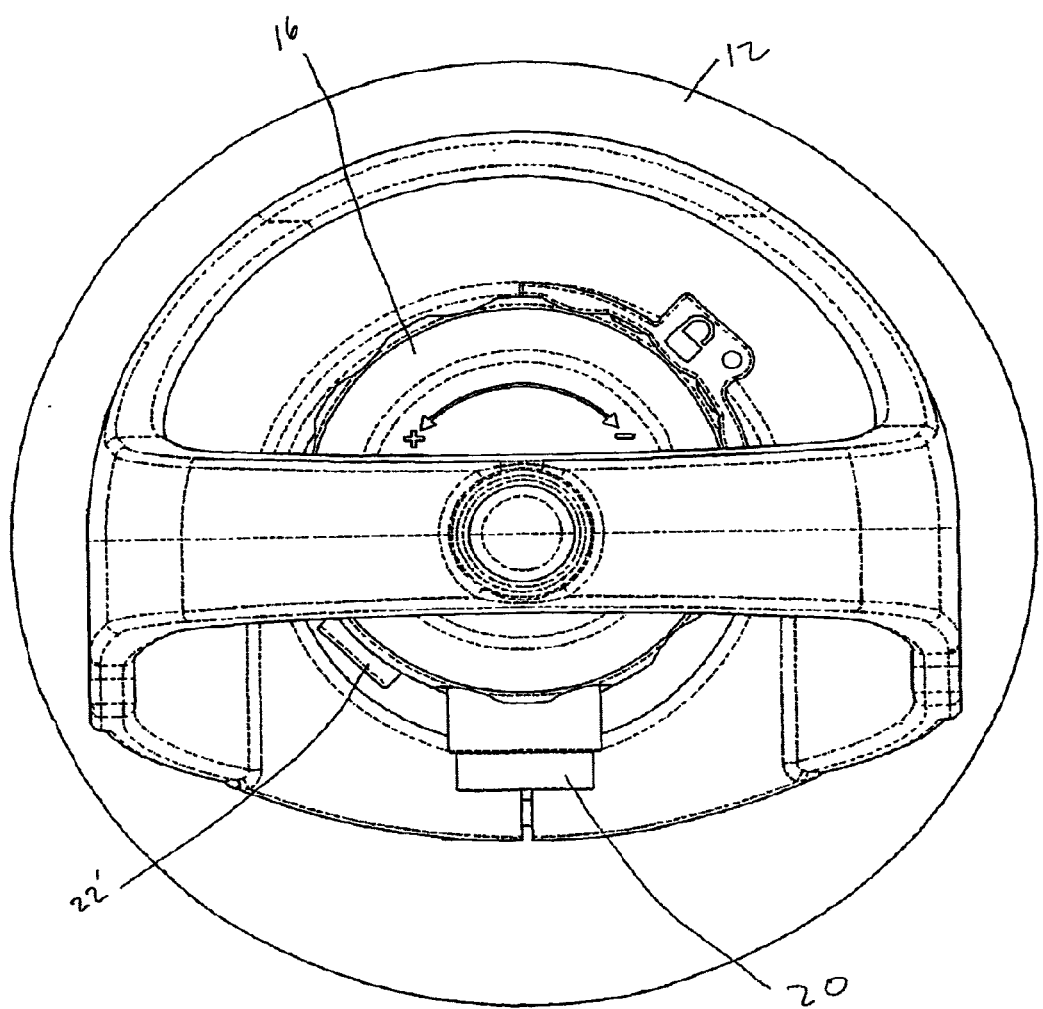
FIG. 4 is an enlarged plan view of the valve and cylinder of FIG. 3.
Figure 5:
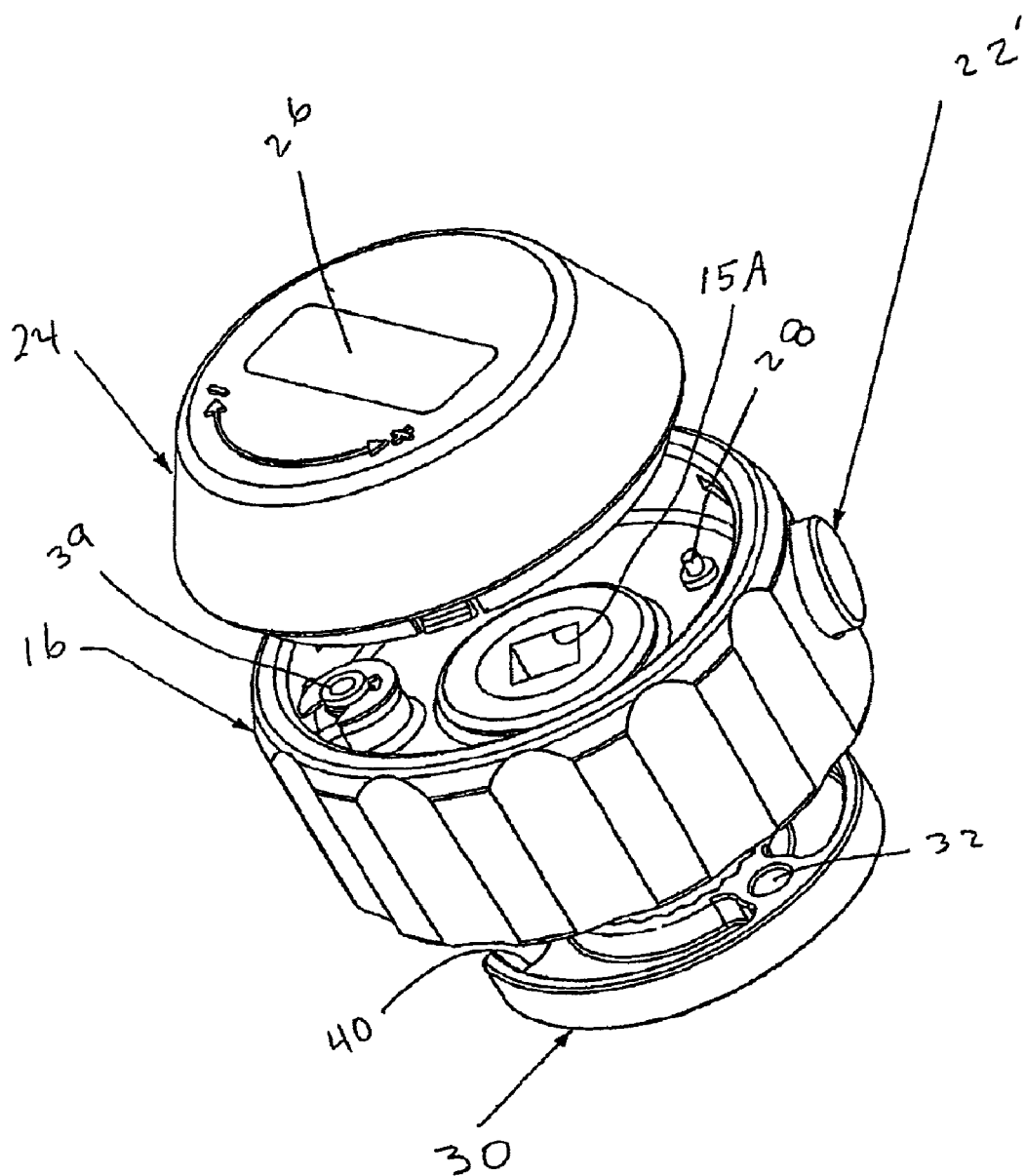
FIG. 5 is an exploded, perspective view of the handle part of the valve of FIG. 1.

Referring to FIGS. 1, 2, and 3, the valve 10 includes a valve body 14, a stem 15 projecting upwardly from the valve body 14, and a handle 16 mounted on top of the valve stem 15 for manually opening and closing the valve 10. FIGS. 1 and 2 show that the valve body 14 includes a threaded inlet port 18 which screws onto the outlet port of the cylinder 12. The valve body 14 also includes an outlet port 20. The valve body 14, the outlet port 20, and the inlet port 18 may be modified for specific uses, cylinder sizes, or gases.

The handle 16 mounts on the valve stem 15. An operator grasps the handle 16 and rotates it in order to open and close the flow of gas from the cylinder 12 to a ventilator or other gas dispensing device (not shown). The handle 16 has a substantially circular cross-section and includes ribs around its outer edge to facilitate grasping the handle.

As shown in FIG. 2B, several electronic devices are mounted in the handle, including a processor 23, a timer 21, a reset button 27, an open/closed sensor 28, a battery 25, a display 26, and an electronic memory device 22. In this embodiment, the memory device 22 communicates with a one-wire port 22' that projects to the exterior of the handle 16. The one-wire port 22' in this embodiment is a metal can, which has the same shape as the portable memory buttons 22A, shown in FIG. 12, that can be used to transfer data from the handle's memory 22 to other devices. This enables the same communication devices to be used with the port 22' and with the memory buttons 22A.

Figure 8:
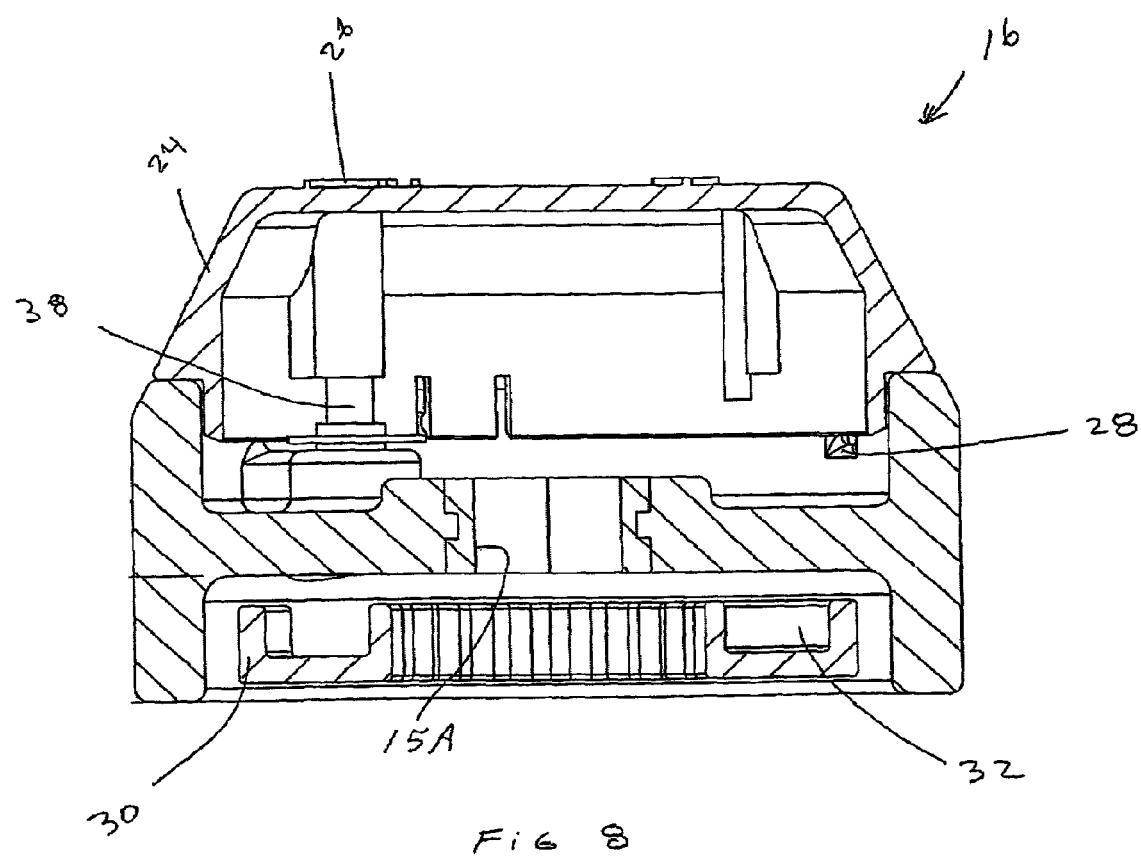
FIG. 8 is a section view taken along the line 8—8 of FIG. 7.

Most of the components of FIG. 2B are housed inside a compartment formed by the handle 16 and the cover 24 in this preferred embodiment. The processor 23 is located inside the handle cover 24 and communicates with the electronic memory device 22. Also inside the handle cover 24 are two (2) small batteries 25. While FIG. 2B shows a single timer 21, there preferably are at least two timers 21, one of which is a calendar, and the other of which is an event timer. The reset button 27, located inside the handle 16, may be depressed to reset the event timer 21. At least a portion of the top surface of the handle cover 24 is clear, in order to permit the user to view the LCD display 26 mounted inside the handle 16. On the underside of the handle 16 is mounted the sensor 28, as seen in FIGS. 1A, 2 and 8. The sensor 28 that is used in this preferred embodiment is a proximity switch model MK20-BV50:170 manufactured by Meder Inc. A collar 30 is mounted onto the valve body 14, just below the handle 16. This collar 30 holds a stationary magnet 32 (See FIG. 1). In the embodiment shown here, the collar 30 has a twenty-four-sided interior cross section 34 which fits directly onto the nut 36 on the valve body 14, so the collar 30 remains stationary relative to the valve body as the handle 16 is rotated to rotate the valve stem 15, in order to open and close the valve. The angular position of the collar 30 may be changed by lifting it up and rotating it, then fitting it back down over the nut 36. However, this can be done only when the handle 16 is removed from the valve 10.

Figure 9:
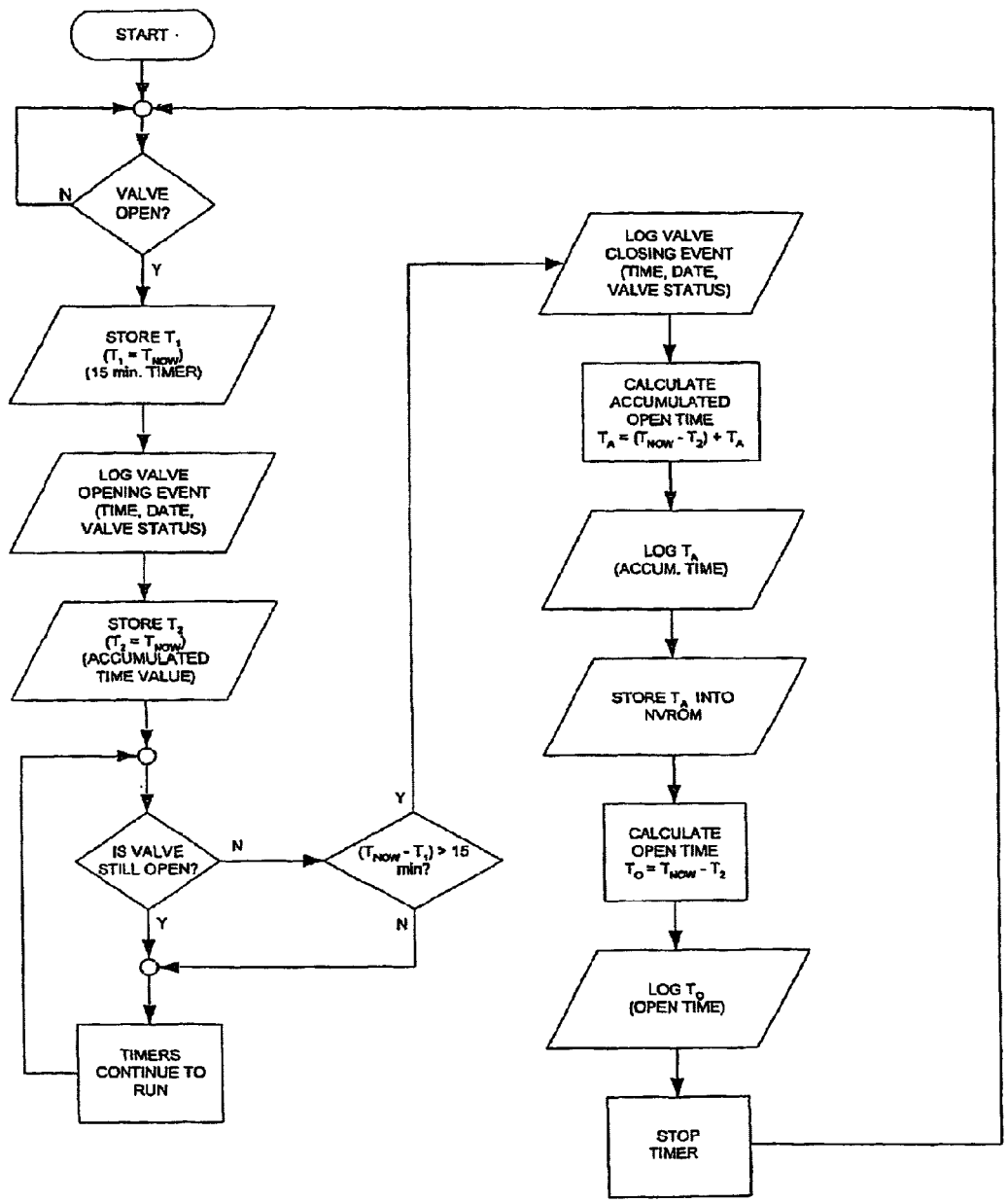
FIG. 9 is a schematic operational logic diagram for the valve handle of FIG. 1.
Figure 10:
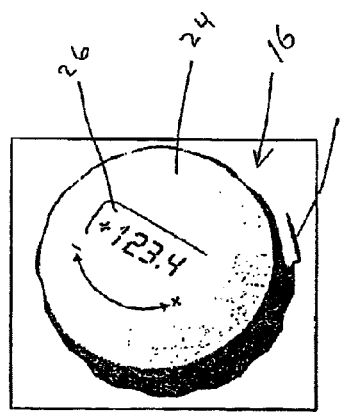
FIG. 10 is a perspective view of the handle of the valve of FIG. 1.
Figure 11:
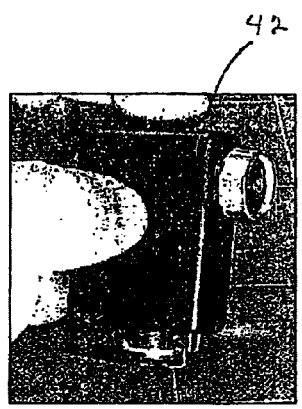
FIG. 11 is a perspective view of a hand-held recorder used to export data from the valve of FIG. 1.

The handle 16 is protected from undesired removal by a special stud 38 (such as a "Torx" stud) and its corresponding security nut 39 (See FIG. 5), making it difficult for anyone to tamper with the position of the collar 30 and magnet 32, as will be explained in detail later. The proximity sensor 28 is mounted on the handle 16, and the collar 30 is positioned so that, when the handle 16 is rotated to the closed position, the sensor 28 is adjacent to the magnet 32 that is fixed to the collar 30. When the proximity sensor 28 is adjacent to the magnet 32, it sends no signal to the processor 23, thereby indicating that the valve is in the "closed" position. When the handle 16 is rotated to open the valve, the proximity sensor 28 senses that it has been moved away from the magnet and sends a signal to the processor 23, indicating an "open" position. The processor 23 instructs the memory 22 to record the event of opening the valve and to record the time and date of the event as indicated by the calendar timer 21. The processor 23 instructs the memory device 22 to continue checking the position of the valve as long as the valve 10 is open. When the valve is closed, the processor uses the logged open and close times to calculate the amount of time the valve was open and instructs the memory device 22 to record that duration as well a recording an accumulated open time duration. Thus, every time the valve 10 is opened, the time and date of the event is recorded, the closing time and date is recorded, the duration of time during which the valve 10 is open is calculated and logged, and the accumulated open time is calculated and logged. FIG. 9 shows the operational logic for the timing and logging operation.

While the simple proximity sensor 28 and magnet 32 are used in this preferred embodiment, many other arrangements are known in the art for sensing and signaling when the valve 10 is open and when it is closed, and it would be obvious to those skilled in the art to use other known sensing arrangements.

The display 26 may be arranged to display in a variety of ways. However, in this embodiment, it alternates flashing of two different numbers—first the accumulated open time, and then the open time for the current event preceded by a "plus sign". If the valve is closed, then the current event open time flashes as a "minus sign" with no digits adjacent to the "minus sign".

The threaded security stud 38 is fixed at its top end to the handle cover 24 and projects downwardly. It is received by the special security nut 39, which is rotatable relative to the handle 16 but is trapped onto the underside of the handle 16. The nut 39 must be unthreaded from the stud 38 in order to remove the handle cover 24 to allow access to the interior of the handle 16. This arrangement helps make the handle 16 tamper-proof. Once the handle cover 24 has been removed, there is access to the batteries 25, reset button 27, and so forth, and there is access to the screw 37 which secures the handle 16 to the valve stem 15.

An optional locking device 54 (See FIGS. 1A and 2A) prevents inadvertent rotation of the handle 16 during transport and can only be installed when the valve handle 16 is in the closed position. This serves to provide additional visual cues of the valve handle 16 position to the user. The locking device 54 preferably is made of plastic and includes a curved wall 56, which conforms closely to the shape of the outside wall of the valve handle 16. An arm 58 extends inwardly from the lower end of the wall 56, and a finger 60 projects upwardly from the free end of the arm 56. The finger 60 is designed to mate with the hole of the security nut 39, while the arm 58 fits snugly within the notch 40 of the fixed collar 30. A tab 62 at the top end of the locking device 56 projects both outwardly and inwardly, so that, when installed, the inward portion of the tab 62 snaps over the top of the handle 16 to retain the locking device 56 in place on the handle 16, with the finger 60 mated to the security nut 39 and the arm 58 in the notch 40 of the collar 30.

Since the collar 30 is fixed on the valve 14, and the arm 58 of the locking device 54 is caught in the notch 40 of the collar 30, the locking device 54 is fixed and does not rotate relative to the valve body 14. Furthermore, since the finger 60 is attached to the arm 58 (which is part of the locking device 54), and is mated to the security nut 39 (which is part of the handle 16), then the handle :16 is also unable to rotate relative to the valve body 14. In order to open the valve 10, the locking device 54 is removed by pushing downwardly on the outwardly-projecting portion of the tab 62 to release the inwardly-projecting portion of the tab 62 from the top of the handle 16, and then the locking device 54 is slid downwardly to remove the finger 60 from the nut 39 and to remove the arm 58 from the notch 40. Then, the handle 16 can be rotated to open the valve 10. As long as the locking device 54 is properly attached to the valve 10, accidental opening of the valve 10 (such as due to vibration during transport) is unlikely.

Installation of the Valve and Handle:

The following steps may be taken to install the valve and handle on the gas cylinder. First, the valve body 14 (without the valve handle 16) is installed onto the cylinder 12 by threading the inlet port 18 of the valve body onto the cylinder 12. At this point, the valve stem 15 is in the full clockwise (closed) position. The cover 24 is removed from the handle 16, and the handle 16 is temporarily placed onto the valve stem 15 by placing the square hole 15A of the handle 16 over the valve stem 15. The handle 16 should be in a position in which there will be easy access to the memory module 22. The location of the security nut 39 should be noted, and then the handle 16 should be removed from the valve stem 15.

Figure 6:
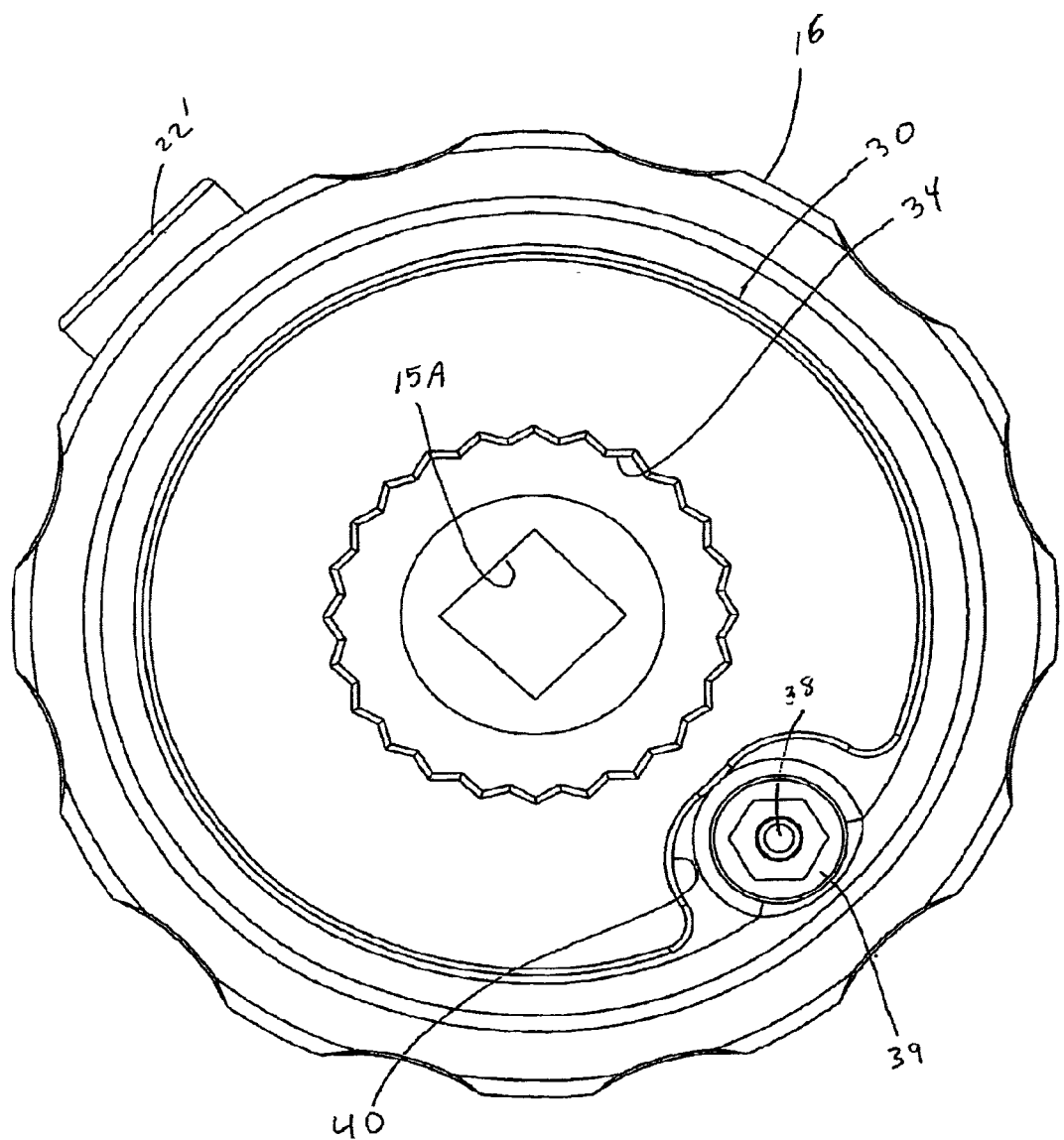
FIG. 6 is an enlarged bottom view of the assembled handle of FIG. 5.
Figure 7:
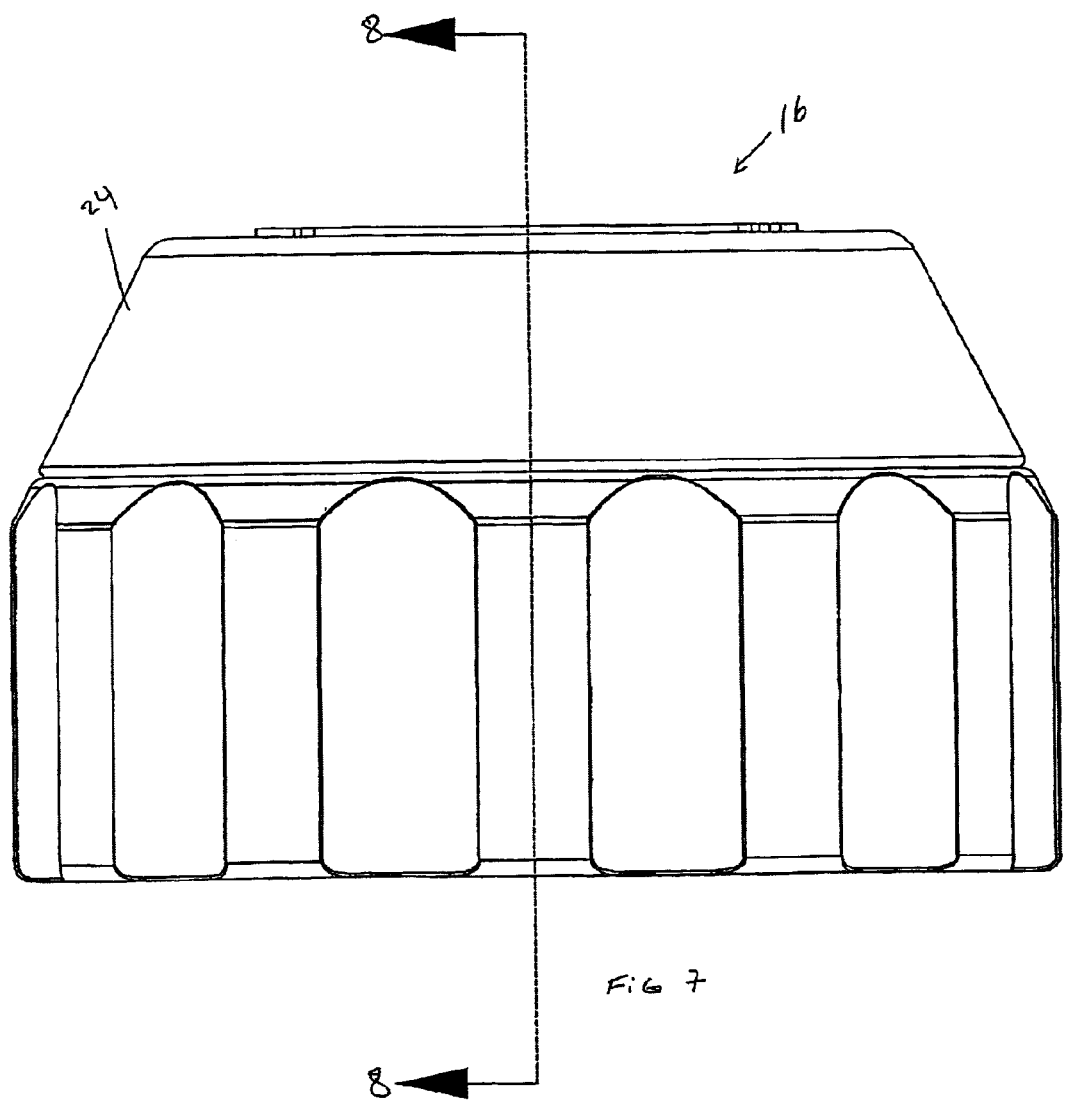
FIG. 7 is an enlarged side view of the assembled handle of FIG. 5.

As shown in FIGS. 2 and 6, the collar 30 has a notch 40, which should only line up with the security nut 39 when the valve handle 16 is in the closed position, so the only time there will be access to the security nut 39 will be when the valve is closed. This will ensure that the handle 16 may only be removed when the valve 10 is closed. The target collar 30 should be installed over the nut 36 with the notch 40 in the proper position to provide access to the security nut 39 when the valve is closed. The position of the notch 40 may be adjusted by lifting the collar 30 off of the nut 36, rotating the collar 30, and then reinstalling the collar 30 on the nut 36 until the notch 40 on the collar 30 matches up with the intended location of the security nut 39. The 24-point cross-section 34 of the collar 30 allows for precise positioning of the collar 30 on the hexagonal nut 36.

Once the collar 30 and its notch 40 and magnet 32 are properly positioned onto the valve body 14, the handle 16 can then be placed back onto the valve stem 15, with the square opening 15A of the handle 16 fitting onto the valve stem 15, making sure to align the security nut 39 with the notch 40 on the collar 30. The handle 16 is then secured to the stem 15 by using a Fender washer 35 and threading a button-head cap screw 37 from the top side of the handle 16 into the threaded top of the stem 15, as is well known in the art. (See FIG. 1).

The reset button 27 on the inside of the handle 16 is then depressed to reset the timers 21. The handle cover 24 is then installed onto the handle 16 by lining up the security stud 38 with the security nut 39 and tightening the security nut 39 from below, extending a tool upwardly through the notch 40. This draws the handle cover 24 onto the handle 16. The LCD display 26 should read −00.0 The minus sign indicates that the valve handle is not currently logging time and ensures that the magnet 32 on the target collar 30 and the sensor 28 on the handle 16 are properly aligned. When the valve handle 16 is in the closed position, the LCD display 26 toggles between a " - - - " display indicating that the valve 10 is closed, to a "-XXX" display where XXX represents the total accumulated time the cylinder has been open. When the valve handle 16 is in the open position, the LCD display 26 toggles between the treatment time display and the total accumulated time display.

Configuring the Valve with Smart Handle

Once the valve handle 16 is reset and is mounted on the cylinder 12, the valve handle should now be configured to input the initial parameters such as:

Born on date (date when cylinder was filled)

Cylinder serial number

Gas lot number

Set the timers (which may include a calendar timer and an event timer)

Clear the log registers

Additional area may be available for recording specific notes or information relative to a specific treatment or lot.

This initial configuration would typically be done by the distributor who is filling and supplying the filled cylinders to the user. The distributor uses a computer in which the required software has been previously installed and the initialization parameters have been previously inputted. The distributor inputs the initialization parameters from its computer to the smart handle 16 by some known data transfer mechanism. In this preferred embodiment, the distributor uses the transfer device 44 shown in FIG. 14. This transfer device plugs into the distributor's computer at one end, and the other end fits onto the one-wire port 22' on the handle 16 to transfer the initialization parameter data from the distributor's computer to the memory 22 in the valve handle 16.

Similarly, the user (such as the hospital) may add more data into the memory device 22 of the valve 10. This information may include a patient identification number, a treatment number, and so forth, which the hospital may use for its record keeping and for billing its patients or other end users. One way to add that data is by using a hand held computer 50 or laptop (not shown), inputting the information into the computer 50 and transferring that information to the memory device 22 through an adapter 48 (shown in FIG. 16) and through the transfer device 44.

The hospital or other user, as well as the distributor, may later download the data from the memory device 22 to be used for record keeping and billing.

Valve Operation

Typically, the outlet port 20 of the valve 10 is connected to a delivery device, such as a ventilator (not shown), which is used to adjust the concentration and flow rate or to mix gases administered to the patient. When the valve handle 16 is turned to open or close the valve, the proximity sensor 28 triggers the processor 23 to instruct the memory device 22 to log the event, including date, time, and whether the event was an opening or a closing of the valve. This information is stored in a non-volatile, read-only-memory (NVROM) in the memory device 22. As was explained above, FIG. 9 shows a schematic operational logic diagram for the timer of the valve 10. Thus, as the handle 16 is rotated to open the valve 10 in order to provide gas treatments to patients, the memory device 22 in the handle 16 records the number and duration of the treatments.

All this information may be read or downloaded by the user and/or by the supplier, using a number of data transfer methods. Three methods are described here, but others may also be used.

Figure 12:
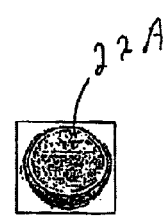
FIG. 12 is a perspective view of a button-type storage device used with the recorder of FIG. 11.
Figure 13:
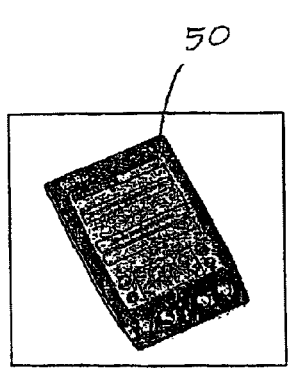
FIG. 13 is a hand-held portable computer which may be used to initialize the memory device on the valve of FIG. 1, and which may be used to export data from the memory device.

1—Using a PIR-2 reader (See FIG. 11), the information may be downloaded into portable DS-1996 iButtons 22A (See FIG. 12). Each portable iButton 22A has enough memory to store the data for 12 valves, with each valve having up to 72 logs.

Figure 15:
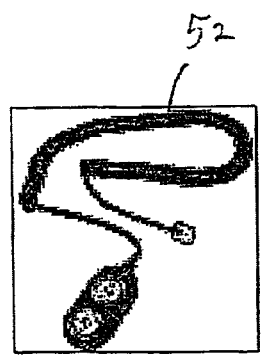
FIG. 15 is a perspective view of a BlueDot receptor that may be used for transferring data from a button-type memory module (as shown in FIG. 12) to a computer.

The data on the portable iButtons 22A may then be transferred to a computer via a DS-1402 BlueDot receptor 52 (See FIG. 15). The data may be imported into a suitable software program, such as a spread sheet program, to generate usage reports or billing reports.

Figure 14:
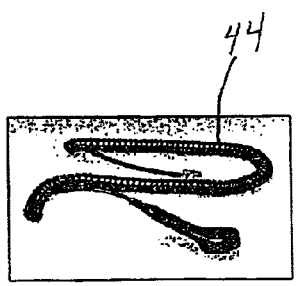
FIG. 14 is a wand reader used to transfer data to and from the valve handle of FIG. 1 and to and from a computer.
Figure 16:
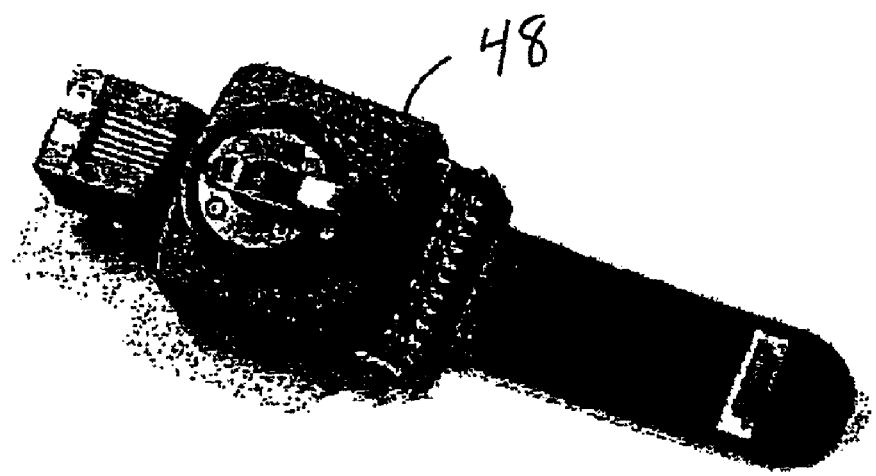
FIG. 16 is an adapter which can be used to download data from the valve of FIG. 1 to a button-type memory module.

2—The data may be downloaded directly onto a hand-held or lap-top computer 50 using a wand reader 44, as shown in FIG. 14, which communicates through the one-wire port 22', and then it may be downloaded from the portable computer 50 to a main computer. Depending upon the types of ports on the computer, an adapter 48, as shown in FIG. 16 may be used. Again, the data may be imported into a suitable software program to generate usage reports or billing reports.

3—The data may be sent directly from the port 22' on the handle 16 to a printer.

The user may use the generated reports to keep a record of the treatments on the patients, for record keeping, for billing the patients, and for checking the billing it receives from its supplier. The supplier may use the generated reports or print outs to bill the user for the treatments and for inventory control purposes.

For instance, a worker may walk around the user's facility (a hospital or clinic, for example) at certain intervals with a reading device and download the data from the ports 22' on the handles 16 of the cylinders 12 to a portable iButton 22A or to some other portable recording device. It would also be possible for the handle 16 to include a transmitter to transmit the data to a remote recording device at intervals or on command, as desired. The HA7MB reader of FIG. 16 (produced by Point Six, Inc. of 391 Codell Dr., Lexington, Ky. 40509, USA) may be used to transfer data from the memory device 22 to portable iButtons 22A using a handheld computer 50. The collected data on the iButtons 22A is then downloaded into a main computer. The software in the computer then uses the data that has been collected to generate reports, to track treatments, do billings, and to control inventory. While this method of moving data from the valve handle 16 to the computer station is preferred, it is understood that many other methods for transmitting the data from the valve 10 to the main computer could be used.

In the first preferred embodiment shown in FIGS. 1–16, a Dallas Semiconductor 1-wire protocol establishes a method for storing and retrieving information from the handle.

Some advantages of this Smart Valve handle system include:

The system provides a convenient way to track and charge for therapy, as the gas is being used, instead of just charging for a bottle of gas. This may be much more desirable for the parties.

Actual treatment time can be ascertained directly at the gas cylinder, and the smart valve 10 is relatively tamper proof, so there is little opportunity for error or fraud.

Little or no paperwork is required, as all the data is stored in electronic format.

The data may be stored as a comma delimited file, making it easy to import the data into spreadsheet or database software (such as Access™ or Excel™) for data servicing and manipulation.

Data logs are also maintained in the Smart Handle device allowing for a back-up of the downloaded material.

The record of the Born On Date (date the cylinder is filled) and Batch number reside at the bottle in the memory device 22. It is not necessary to search this data in files from a serial number or bar code.

The system allows for expansion and software development which will provide hospitals and researchers the ability to track trends in patient use of various treatments, develop therapy protocols, assign patient ID to cylinders, identify and control cylinders for blinded clinical trials, and other uses currently handled by means of complicated and labor-intensive administrative methods.

Various password protections may be used to ensure that only the appropriate users can make certain inputs of data. For example, only the enterprise filling the cylinders should be able to input the Born On Date.

The embodiment described above is only intended to be one example of a device made in accordance with the present invention. It will be obvious to those skilled in the art that modifications may be made to the preferred embodiment described above without departing from the scope of the present invention.

What is claimed is:

1. A method for tracking the use of gas for medical treatments, said gas being confined in a suitable gas container having a valve thereon and a handle to open and close said valve manually, comprising the steps of:
   moving said handle to open said valve;
   sensing the opening of said valve;
   electronically recording onto a memory device as data the opening of the valve and the time the valve was opened;
   moving said handle to close said valve;
   sensing the closing of said valve by a sensing means, and electronically recording onto a memory device as data the closing of the valve and the time the valve was closed;
   calculating from said times a duration of time that said valve was open and electronically recording that duration as data, wherein the sensing means and the memory device are located in an assembly on the handle.

2. A method for tracking the use of gas for medical treatments as recited in claim 1, and further comprising the step of inputting and recording onto the memory device patient identification information.

3. A method for tracking the use of gas for medical treatments as recited in claim 2, and further comprising the steps of:
   importing said recorded usage data and patient identification information from said memory device into a computer; and
   using said imported patient identification information and usage data to create a billing invoice.

4. A method for tracking the use of gas for medical treatments, comprising the steps of:
   mounting a valve on a gas container including a handle for opening and closing the valve manually;
   providing a sensor on said valve which senses when the valve is opened and closed;
   providing a timer on said valve including a calendar timer and an event timer;
   providing an electronic memory device on said valve in communication with said sensor and said timer;
   entering patient identification information into said electronic memory device, said sensor, said timer and said electronic memory device being located in an assembly on said valve handle;
   creating electronic usage data based on the length of time the valve is open and storing that usage data in said electronic memory device;
   electronically communicating the associated patient information and usage data stored in the memory device to a remote computer; and
   using the associated patient information and usage data to generate an invoice.

5. A valve handle assembly for mounting on a valve stem to open and close a valve, said assembly comprising:
   a valve handle body, defining a receptacle for receiving the valve stem;
   a sensor on said valve handle body, for sensing the opening and closing of the valve, said sensor including a proximity switch;
   a timer on said valve handle body, including a calendar timer and an event timer; and
   an electronic storage device mounted on said valve handle body, in communication with said sensor and said timer, wherein said storage device records the date and time of opening and closing of the valve and the duration of time that said valve is open.

6. A valve handle assembly for mounting on a valve stem to open and close a valve as recited in claim 5, further comprising an electronic data input means in communication with said storage device, for permitting a user to enter additional data to be stored with said date and time, and further comprising data output means for downloading data from said electronic storage device.

7. A valve handle assembly as recited in claim 5, and further comprising a reset means on said assembly for resetting said timer.

8. A valve handle assembly as recited in claim 7, wherein said handle assembly further comprises a cover enclosing said sensor, timer, memory and reset means and tamperproof means on said valve handle assembly to prevent unauthorized removal of said cover.

9. A valve handle assembly as recited in claim 5, and further comprising a one-wire communication port projecting to the exterior of said valve.

10. A valve with a smart handle assembly, comprising:
- a valve body for controlling the dispensing of a fluid through said valve;
- a valve stem projecting from said valve body;
- a valve handle assembly mounted on said valve stem for opening and closing said valve, said valve assembly comprising:
- a sensor on said valve handle, which senses the opening and closing of said valve, said sensor including a proximity switch;
- a timer on said valve handle, including a calendar timer and an event timer; and
- an electronic storage device mounted on said valve handle, in communication with said sensor and said timer, wherein said storage device records the opening and closing of said valve and the time of said opening and closing events.

11. A valve with a smart handle assembly as recited in claim 10, and further comprising a port in communication with said storage device, permitting a user to enter additional data to be stored by said electronic storage device.

12. A valve with a smart handle assembly as recited in claim 10, and further comprising a target collar mounted on said valve body and defining a notch to allow access into said valve handle only when said valve is in a closed position, said collar including a magnet which triggers said proximity switch.

13. A valve with a smart handle assembly as recited in claim 12, and further comprising a handle cover and a fastener which secures said handle cover onto said handle, wherein access to said fastener is through said notch.

14. A valve with a smart handle assembly as recited in claim 13, and further comprising a locking device which prevents relative motion of said handle relative to said collar, said locking device including an arm which engages said notch in said target collar, and a projection which engages said handle.

15. A valve with a smart handle assembly as recited in claim 10, said assembly further comprising an electronic data input means in communication with said storage device, for permitting a user to enter additional data to be stored with said date and time, and data output means for downloading data from said electronic storage device.

16. A valve with a smart handle assembly as recited in claim 10, and further comprising a reset means on said handle assembly for resetting said timer.

17. A valve with a smart handle assembly as recited in claim 16, wherein said handle assembly further comprises a cover enclosing said sensor, timer, memory and reset means and tamperproof means on said valve handle assembly to prevent unauthorized removal of said cover.

18. A valve with a smart handle assembly as recited in claim 10, and further comprising a one-wire communication port projecting to the exterior of said valve.

* * * * *